(12) United States Patent
Quehenberger et al.

(10) Patent No.: US 7,832,540 B2
(45) Date of Patent: Nov. 16, 2010

(54) FRICTION CLUTCH HAVING A HYDRAULIC ACTUATOR, AND DRIVE UNIT HAVING AT LEAST ONE SUCH FRICTION CLUTCH

(75) Inventors: Johannes Quehenberger, Saalbach (AT); Dieter Schmidl, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 463 days.

(21) Appl. No.: 11/921,338

(22) PCT Filed: May 26, 2006

(86) PCT No.: PCT/EP2006/005027

§ 371 (c)(1),
(2), (4) Date: Feb. 29, 2008

(87) PCT Pub. No.: WO2006/128637

PCT Pub. Date: Dec. 7, 2006

(65) Prior Publication Data

US 2009/0038908 A1      Feb. 12, 2009

(30) Foreign Application Priority Data

May 31, 2005   (AT)   .............................. GM359/2005

(51) Int. Cl.
*F16D 48/02*   (2006.01)
*F16D 25/0638*   (2006.01)
(52) U.S. Cl. ............... 192/85.31; 192/85.32; 192/85.42
(58) Field of Classification Search ............. 192/85.27, 192/85.31, 85.32, 85.42
See application file for complete search history.

(56) References Cited

U.S. PATENT DOCUMENTS

| 4,845,982 | A | | 7/1989 | Gilbert |
| 4,875,561 | A | * | 10/1989 | Schneider et al. ............ 475/180 |
| 6,240,758 | B1 | | 6/2001 | Nagakura |
| 7,104,380 | B2 | * | 9/2006 | Bishop et al. ............. 192/85.32 |
| 2006/0162328 | A1 | | 7/2006 | Quehenberger et al. |

FOREIGN PATENT DOCUMENTS

| DE | 33 05 999 C1 | 5/1984 |
| DE | 38 39 318 A1 | 6/1989 |
| DE | 44 44 381 A1 | 6/1996 |
| WO | 2004/040158 A | 5/2004 |

* cited by examiner

*Primary Examiner*—Richard M. Lorence
(74) *Attorney, Agent, or Firm*—Harness, Dickey & Pierce, P.L.C.

(57) ABSTRACT

The invention relates to a friction clutch having a single-acting actuator which is a piston-cylinder unit and is connected in a controllable fashion to a pressurized fluid source. In order to be able to carry out a fast pilot stroke up to the point at which the clutch makes contact, the piston-cylinder unit has a stepped piston whose first step of small diameter delimits, by means of its cylinder, a first pressure space, and whose second step of relatively large diameter delimits, by means of its cylinder, a second pressure space, a pressure line being connected to the first pressure space and, by means of a first non-return valve which opens at a certain pressure, to the second pressure space, and it also being possible for the second pressure space to be connected via a discharge line and a suction line, which contains a second non-return valve, to the fluid reservoir. The invention also relates to a drive device having clutches of said type.

24 Claims, 7 Drawing Sheets

FRICTION CLUTCH HAVING A HYDRAULIC ACTUATOR, AND DRIVE UNIT HAVING AT LEAST ONE SUCH FRICTION CLUTCH

CROSS-REFERENCE TO RELATED APPLICATIONS

This application is a National Stage of International Application No. PCT/EP2006/005027, filed May 26, 2006. This application claims the benefit of Austrian Patent Application No. GM 359/2005, filed May 31, 2005. The disclosures of the above applications are incorporated herein by reference in their entirety.

FIELD

The invention relates to a friction clutch having an actuator, such as a single-acting hydraulic actuator, with which a disk pack can be brought into friction locked connection against the force of a spring. The hydraulic actuator may be a piston-in-cylinder unit which is in communication with a pressure fluid source in a controllable manner via valves. The friction clutch may act both for the locking of a differential and for the control of the torque assigned to an axle or to a wheel. The friction clutch may, however, also be part of a manual transmission, in particular of a dual-clutch transmission. The actuator acts in the closing direction of the clutch such that the spring acts in the opening direction.

BACKGROUND

Demands on the controllability of friction clutches are very high in applications in the powertrain of a motor vehicle, both with respect to the precision of the setting of a specific torque and with respect to the speed or with respect to the delay-free response of the control in the engagement or release of the clutch. There is also the demand for intrinsic safety. This means that the most secure state (usually that is the released clutch) should be adopted automatically in the event of system failure.

A generic friction clutch is known, for example, from WO 2004/040158 A2. It has a controllable motor/pump unit as the pressure fluid source and a fast-opening valve as the valve. A fast release of the clutch is thus achieved. If this clutch or any other generic clutch should be engaged from the fully released position, the actuator must travel a specific path (the so-called "prestroke") until the clutch beings to grip. The dead time passing in this context stands in the way of a fast and sensitive control of the clutch. This is even more the case since the clutch should have friction losses which are as small as possible in the disengaged state with a large speed difference between the two clutch halves. The prestroke, and thus the dead time, is then namely substantial.

SUMMARY

The present teachings configure an actuator such that the prestroke can be passed through as fast as possible. The response behavior, and thus the control characteristics, of the clutch are thus substantially improved with an effort which is as small as possible.

In accordance with the present teachings, a piston-in-cylinder unit has a stepped piston whose first step of small engagement surface (with an as usual circular engagement surface also of small diameter) bounds a first pressure space with its cylinder, and whose step of larger engagement surface bounds a second pressure space with its cylinder. The first pressure space is connectable to the second pressure space via a pressure line containing a first check valve when a specific pressure has been reached in the first pressure space or when the stepped piston has traveled a specific path. The second pressure space is furthermore connectable to the pressure fluid reservoir via a drain line and a suction line containing a second check valve.

Because only the force of the spring has to be overcome during the prestroke, a small piston surface is sufficient, which produces an increased engagement speed, and thus a fast passing through of the prestroke, with the same fluid flow. In order not to hinder this, the part of the piston forming the second step may suck fluid from the pressure fluid reservoir through the suction line and into the enlarging second pressure chamber with an open second check valve. As soon as the disk pack has been compressed so much that it starts the transmission of a torque, either the force to be overcome increases or the piston has traveled a specific path, whereby the path to the second pressure space becomes free. In the first case, the first check valve opens.

As noted, the second pressure space is furthermore connectable to the low-pressure side of the pressure fluid source via the drain line, with the flow communication being established by a valve unit which may be configured. A simplification of the valve unit may be achieved when the drain line is connected to the pressure line via a third check valve.

When the control of the clutch utilizes the force exerted onto the clutch disks as a feedback signal, a compensation line with a restriction point is provided that bypasses the third check valve. A particularly accurate feedback signal is obtained when a pressure sensor is attached to the drain line between the second pressure space and the third check valve. The pressure prevailing in the first pressure space is thus also taken into account.

If the transition to the second pressure space should be opened when the stepped piston has traveled a specific path on the control of the clutch, there are two options: either the pressure line is arranged in the interior of the stepped piston and ends at the periphery of the first step of the stepped piston at a point which opens toward the second pressure space after a specific path of the stepped piston; or the pressure line is arranged in the cylinder of the piston-in-cylinder unit (that is fixed to the housing) and ends at the periphery of the first step at a point which is released by the stepped piston after a specific path thereof. A higher pressure may act at the first pressure space and, if a first check valve is also present, it may be configured for a smaller opening pressure. A higher underpressure thereby first arises in the second pressure space so that more fluid is sucked in again faster via the second check valve due to the larger pressure difference.

A further restriction point may be provided in the named passage. The pressure difference between the first and second pressure chambers is thereby increased and the opening pressure of the first check valve may be selected to be smaller. This reduces errors in the measurement of the pressure and thus the pressing force in the stationary state. Furthermore, temperature-induced increased suction resistances in the second check valve may thus be compensated.

The pressure fluid source and the valves for the control can be configured very differently. In a first variant, corresponding to WO 2004/040158 A2, the pressure fluid source is a controllable motor/pump unit which is connectable to the pressure line and to the drain line by means of a self-controlling valve unit having a fast-opening valve and a fourth check valve. The clutch is therefore actuated via the control of the electric motor, wherein control is able to be very fast and exact. The hydraulic transmission takes place via the self-controlling valve unit which ensures, without any control from outside, that the clutch may be opened fast and returns on its own into its secure (disengaged) position on a failure of the electrics. In particular, the fast-opening valve opens when the pump pressure drops or ceases. For this purpose, the self-controlling valve unit has a fast-opening valve on which the pressure acts which prevails on the side of the pump facing it.

The fast-opening valve may consist of a sleeve and a spring-assisted slider therein, wherein the sleeve has at least one first opening through which a pressure medium can flow out of the piston-in-cylinder unit and the slider is displaceable between a first position in which it releases the first opening and a second position in which it covers the first opening. In this context, the force of the spring predominates in the first position of the slider and the force exerted on it by the pressure medium predominates in the second position.

A second opening may also be provided in the sleeve beneath the first opening, wherein the second opening is in communication with the first pressure space and is released by the slider with a reducing pressure of the pressure fluid source after (i.e., later than) the first opening. In this case, the drain line is connected to the pressure line via a third check valve. It is thus achieved that the fast-opening valve opens the clutch completely, including the air space.

The pressure fluid source may be a controllably moved master piston in a master cylinder which is connected to the pressure line and to the drain line. The master piston is then moved in a correspondingly controlled manner. In this case, the piston must release the venting bore so that the venting path can be passed through on the opening.

The pressure fluid source may be connected conventionally (for example to a fixed displacement pump and to a pressure store) and via a control valve to the pressure line and to the drain line. The control valve is suitable to control the fluid flow (mass flow) in both directions.

The present teachings also provide a drive unit for the control of the torque distribution to two output shafts for which the friction clutch forming the subject matter of the invention is particularly suitable. With this drive unit, two friction clutches may be provided, each for one output shaft, which are supplied by a common pressure fluid source which is a reversible motor/pump unit. They are commanded by a common control unit, with either the one or the other friction clutch being acted on by reversing, the clutches thus being actuated in opposite senses.

In another configuration of the drive unit, the drain lines of both friction clutches are connectable to one another via a further valve. The further valve is a safety valve which ensures that, in the event of system problems or a power failure, the effective pressure, and thus the transmitted torque, initially remains the same on both sides (so that the vehicle does not leave the road laterally) and is fully reduced equally symmetrically in the following. In non-disturbed operation, the safety valve is kept closed against spring force. It opens on a disturbance or on a power failure. If, for example, one of the two fast-opening valves jams, the pressure reduction on both sides can take place via the respective other fast-closing valve.

DRAWINGS

The invention will be described and explained in the following with reference to Figures. There are shown, schematically.

DETAILED DESCRIPTION

Figure 1:
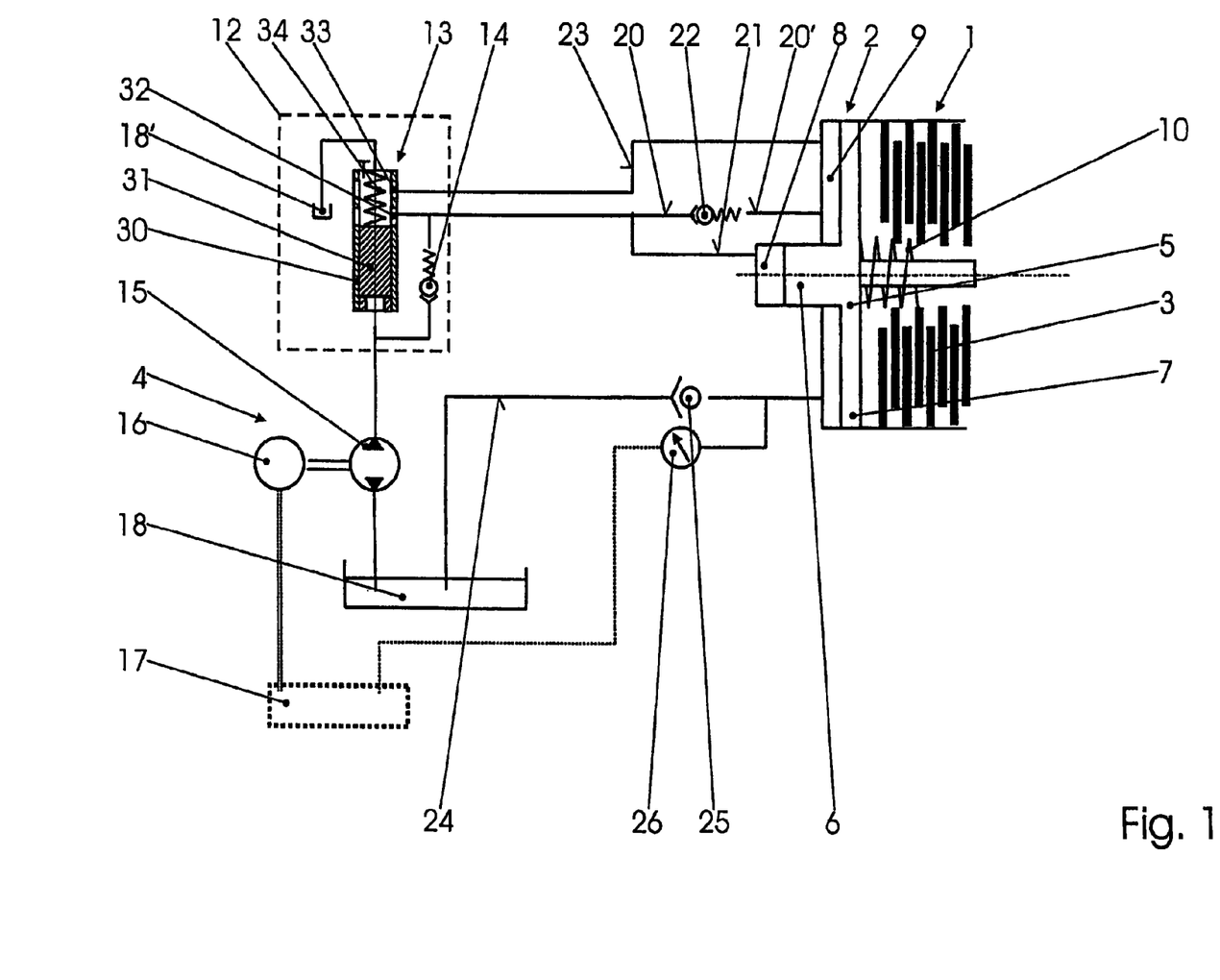
FIG. 1 illustrates a first embodiment of the clutch in accordance with the present teachings.

In FIG. 1, a clutch 1 is only indicated by a hydraulic actuator 2 and a disk pack 3. The actuator 2 is a piston-in-cylinder unit which may be acted on by a pressure fluid provided by a pressure source 4. The actuator 2 contains a stepped piston 5 whose two steps have different effective diameters. A first step 6 of the stepped piston has a small diameter and bounds a first pressure space 8 with the housing or cylinder. A second step 7 of the stepped piston has a large diameter and bounds a second pressure space 9. The first step with the small effective surface serves for the overcoming of the prestroke only against the force of a spring 10 while the second step additionally serves for the compressing of the disk pack 3 to establish a friction locked connection.

The pressure fluid source 4 may be a reversible pump 15 that is driven by an electric motor 16 and that sucks in the fluid to be pumped from a reservoir 18. The electric motor 16 is controlled by a control unit 17 with respect to direction of rotation and speed so that the pump 15 can pump variable fluid flows in both flow directions. A control valve unit 12 is disposed between the pressure fluid source 4 and the clutch 1 and may include a fast-opening valve 13 and, parallel thereto and bypassing it, a main check valve 14. A pressure line 20 leads from the fast-opening valve 13 and the main check valve 14 via a first check valve 22 into the second pressure space 9. A branch line 21 leads, without an interposed valve, from the pressure line 20 upstream of the first check valve 22 into the first pressure space 8. Furthermore, a drain line 23 establishes the communication from the second pressure space 9 to the fast-opening valve 12 which enables a particularly fast lowering of the pressure in the second pressure space 9 on a reversal of the sense of rotation of the pump 15.

Finally, a suction line 24 with a second check valve 25 is provided through which fluid is sucked from the reservoir 18 into the second pressure space 9 as long as the stepped piston 5 is only moved by filling the first pressure space 8. When the pressure in the pressure line 20 and in the branch line 21 has reached a specific value, the first check valve 22 opens for the action on the second pressure space 9. The second check valve 25 closes at the same time. A manometer 26 is connected at the suction line 24 between the second pressure space 9 and the second check valve 25 and makes a pressure signal available to the control unit 17 as a feedback signal.

The fast-opening valve 13 substantially corresponds to the fast-opening valve described in WO 2004/040158 A2. It consists of a sleeve 30 in which a slider 31 is guided. The pressure generated by the pump 15 acts on the slider 31 at the one side (from the bottom in FIG. 1) while a spring 34 acts on the other side of the slider 31. The pressure line 20 opens into a second opening 32 in the sleeve 30 while the drain line 23 opens into a first opening 33 in the sleeve 30. In the position shown, the fast-opening valve 13 is in its lowest position, the drain position. In this position, fluid from the drain line 23 can flow off into the reservoir 18' through the second opening 32. As the pumping pressure of the pump 15 increases, the slider 31 is raised against the force of the spring 34 until it covers the two openings 32, 33. The main check valve 14 opens approximately simultaneously and pressure fluid enters into the pressure line 20.

Figure 2:
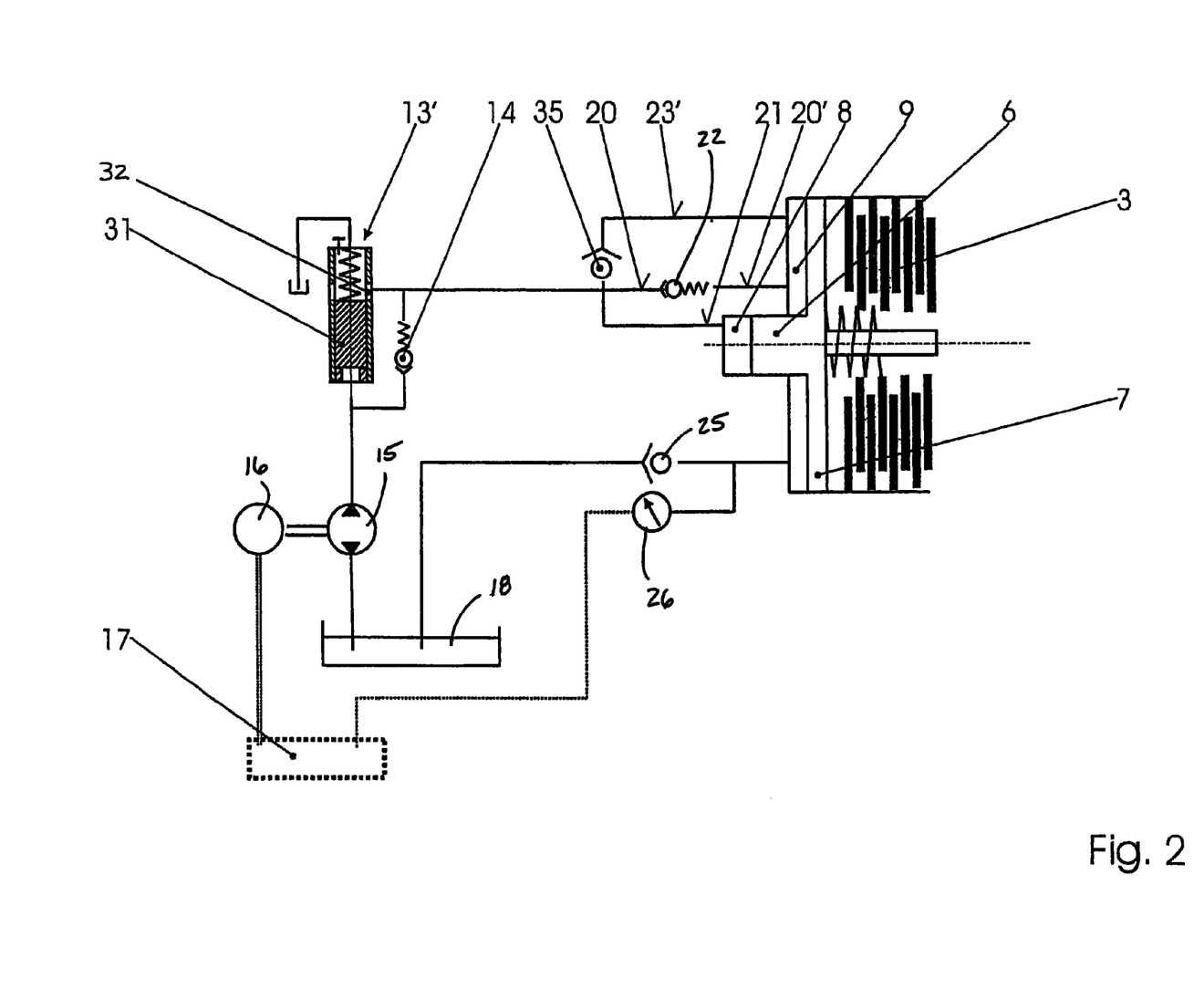
FIG. 2 illustrates a modification of FIG. 1.

The variant of FIG. 2 only differs from this in that the drain line 23' opens via a third check valve 35 into the pressure line 20. This permits a simplification of the fast-opening valve 13' such that only a second opening 32' is needed.

Figure 3:
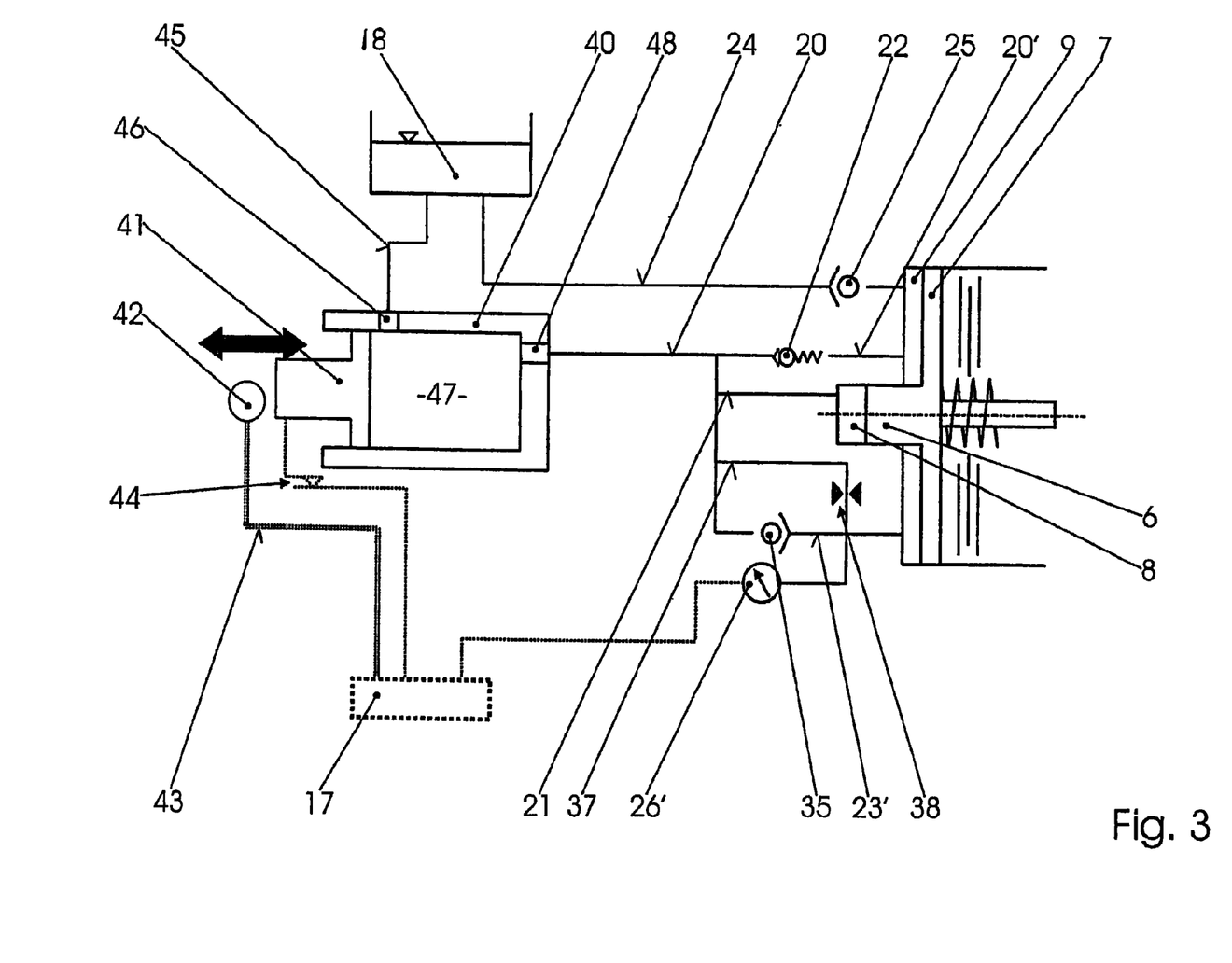
FIG. 3 illustrates a third embodiment with a variant of the pressure source.

The embodiment of FIG. 3 differs from the preceding embodiments by the type of the pressure fluid source and in that the third check valve 35 in the discharge line 23' is bypassed by a compensation line 37 with a restriction point 38. The manometer 26' is also attached at this point. The compensation line 37 compensates the pressure difference between the two chambers 8, 9 in approximately stationary operating states and so produces a very precise value for the force exerted onto the disk pack 3 by the stepped piston 5 and measured by the manometer 26'.

The pressure fluid source is a master cylinder 40 in which a master piston 41 is set into motion by a mechanical or hydraulic drive 42 only schematically indicated. This drive 42 is controlled by the control unit 17 by means of a signal 43. A position sensor 44 makes a position signal available to the control unit 17 which can likewise be processed by the control here. The master cylinder 40 is connected to the reservoir 18 via a vent bore 46 and a connection line 45. The pressure space 47 bounded by the master piston 41 is in communication with the pressure line 20 via an outlet opening 48.

Figure 4:
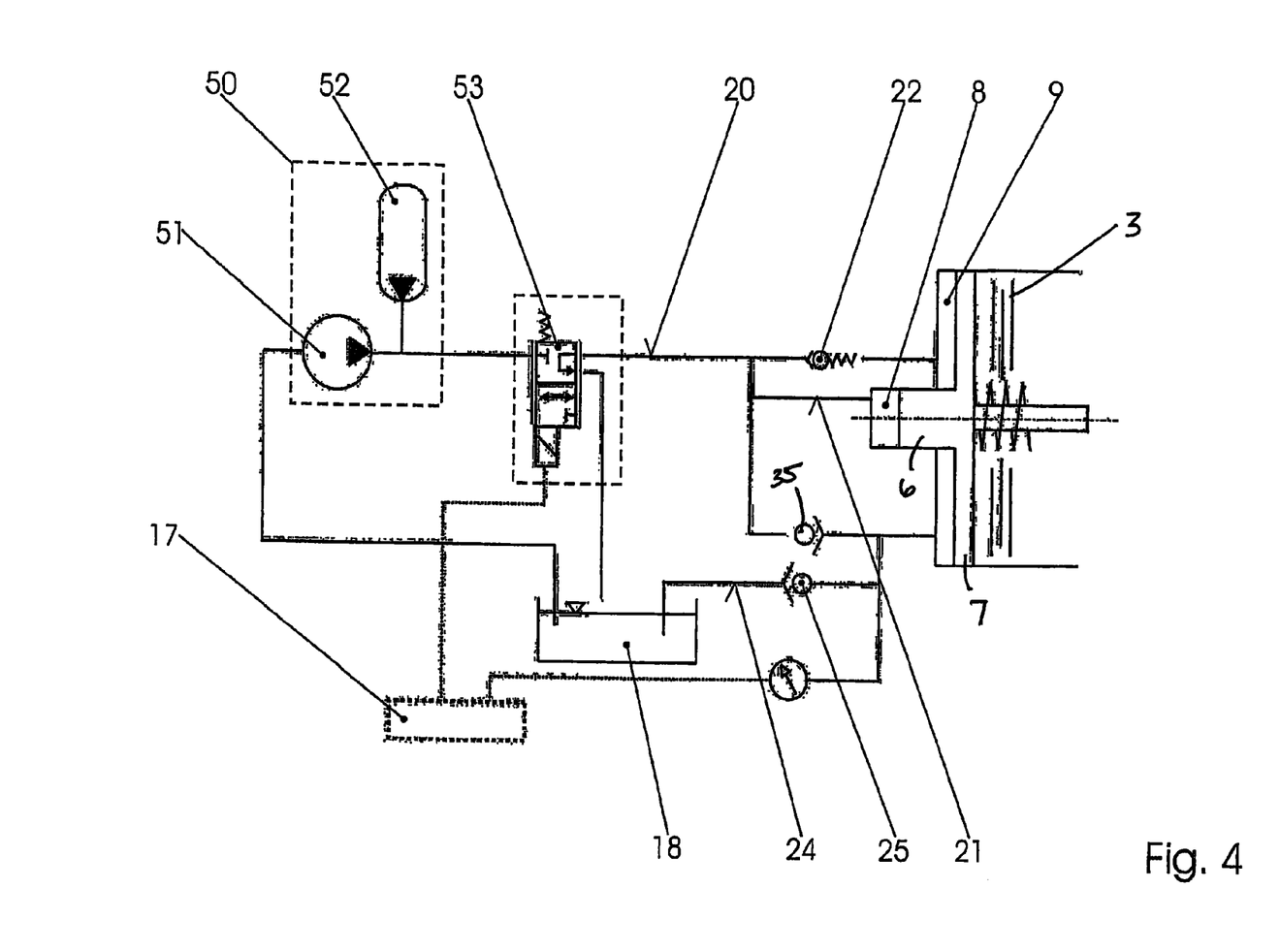
FIG. 4 illustrates a fourth embodiment with a further variant of the pressure source.

The embodiment of FIG. 4 differs from the previous embodiments in that a fixed displacement pump 51 and a pressure compensation vessel 52 serve as the pressure fluid source 50 and furthermore in that the control of the clutch takes place by means of a common solenoid valve 53 which controls the pressure and/or the flow rate in the pressure line 20 in the usual manner.

Figure 5:
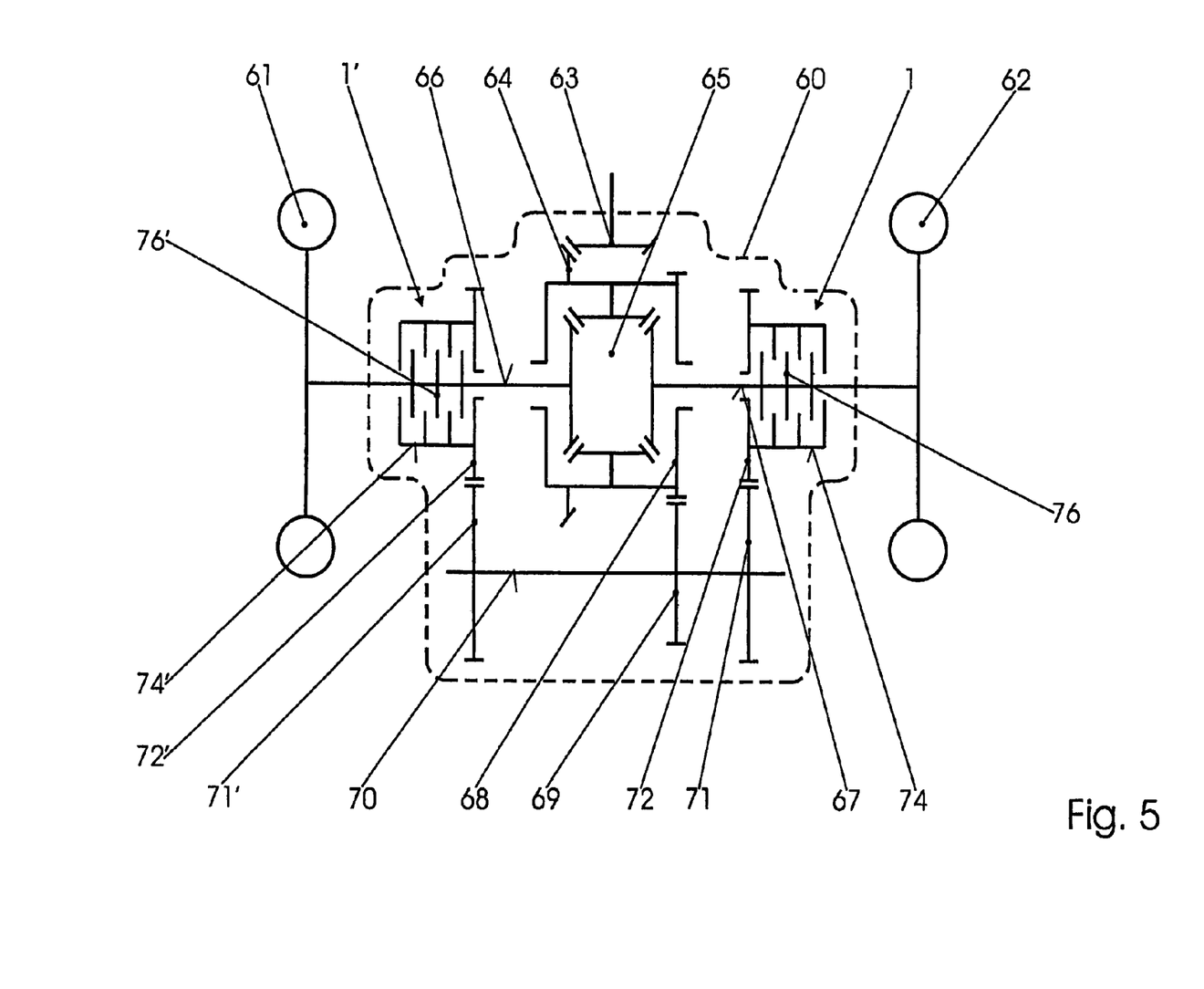
FIG. 5 illustrates a drive unit with two clutches.

FIG. 5 shows a possible application of the clutch in a drive unit 60 of a motor vehicle, with this drive unit being able to be arranged either between the wheels of one axle or between two axles. The drive unit 60 whose housing is indicated by a broken line is arranged between the two wheels 61, 62 of an axle. A drive shaft 63 with a pinion drives a differential cage 64 via its crown wheel. The actual differential 65 located in the differential cage 64, here a common bevel gear differential, distributes the torque to the two wheel shafts 66, 67. To be able to influence the torque distribution, a first gear 68 of the differential cage 64 drives, via a second gear 69 and a third gear 71, 71' of a lay shaft 70, in each case a fourth gear 72, 72' on opposite sides. The gears 72, 72' on both sides are each connected to an outer clutch part 74, 74'. Their inner clutch parts 76, 76' are seated on the wheel shafts 66, 67 and can thus transmit an additional torque to the two wheel shafts due to the translation from the gears 68, 69, 71, 72.

Figure 6:
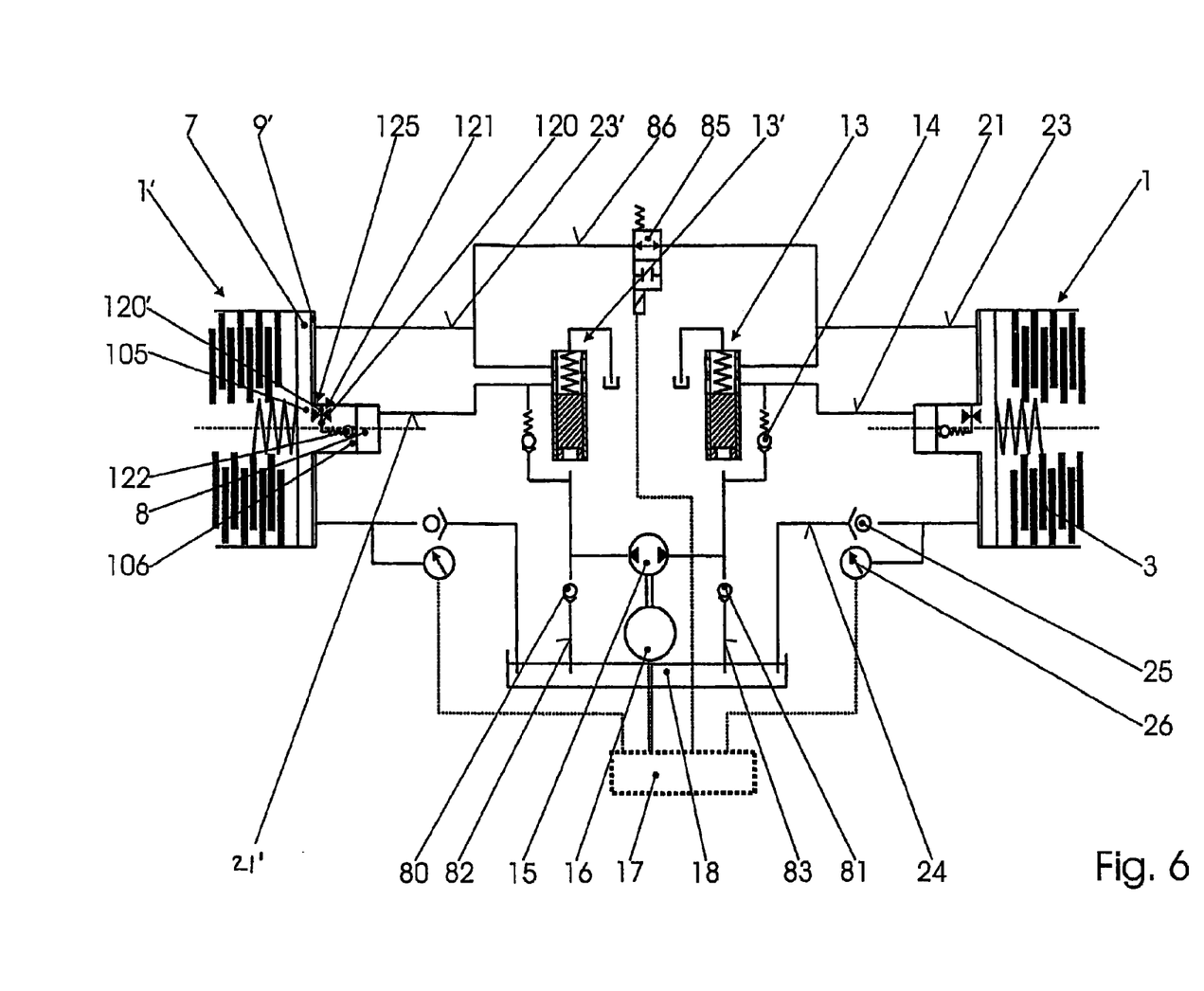
FIG. 6 illustrates a fifth embodiment in a drive unit in accordance with FIG. 5.

FIG. 6 shows the control of the drive unit described with reference to FIG. 5, for example. Here, the two clutches 1, 1' and their actuators are the same on both sides and their reference numerals also used for parts already described. Both clutches 1, 1' have a common pressure fluid source 15, 16 which delivers pressure fluid to either the one or the other side depending on the sense of rotation. For this purpose, a fifth and a sixth check valve 80, 81 are provided in the suction pipes 82, 83. Of these and dependent on the pumping direction of the pump, one of the two check vales 80, 81 opens and the other 81, 80 closes. Furthermore, the two clutches 1, 1' are connected to one another via a short-circuit line 86 with a safety valve 85 so that, when the pressure drops, the drain line 23 of the right hand side does not flow via the fast-opening valve 13, but via the safety valve 85 to the side with the fast-opening valve 13' and there, optionally, directly into the second pressure chamber 9'.

A further modification may be seen in FIG. 6. A first check valve 122 is not fixed to the housing, but is accommodated in a first step 106 of the stepped piston 105. It connects the first pressure space 8 via a pressure line 120 in which a restrictor 121 is provided to the second pressure space 9', but only when its opening goes over the edge 125 and it is open toward the second pressure space 9'. It is thus achieved that the action on the second pressure space 9' is not only pressure-controlled, but also, or optionally, only path-controlled.

Figure 7:
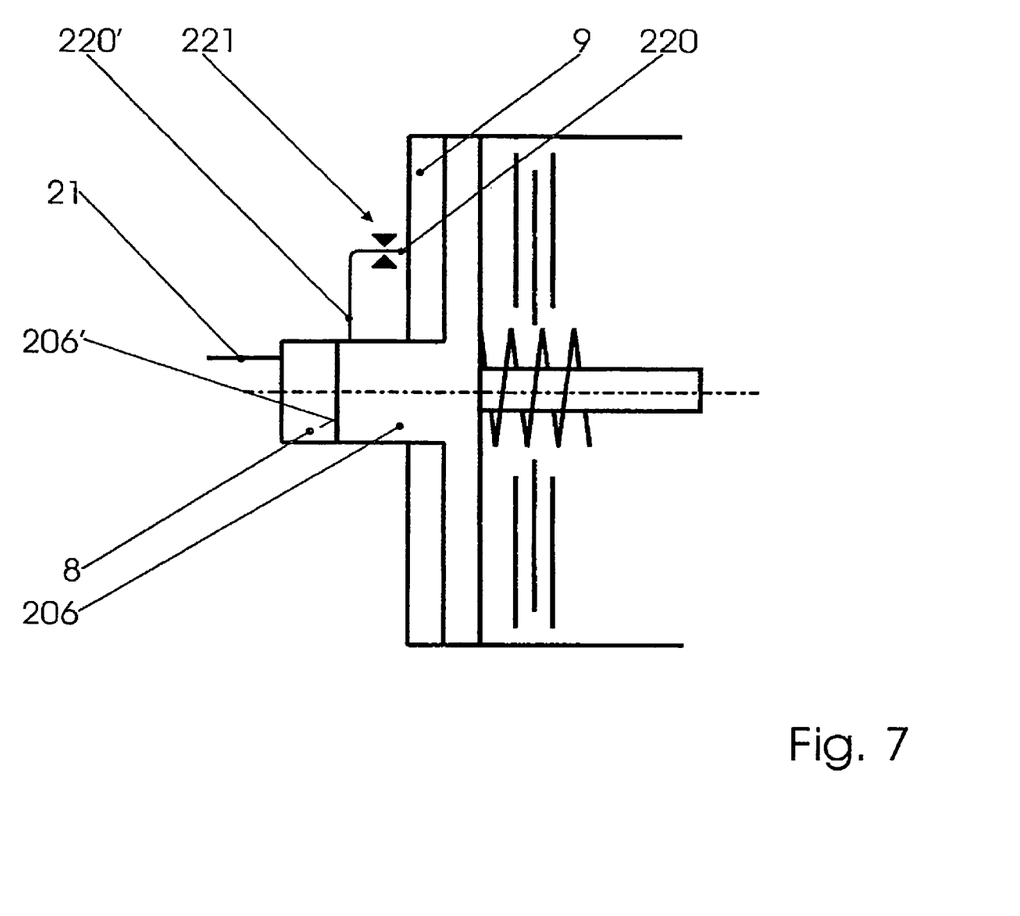
FIG. 7 illustrates a detail variant of FIG. 6.

The detail variant of FIG. 7 differs from that of FIG. 6 in that the connection line 220 with a restrictor 221 is here not arranged in the piston, but in the cylinder, that is fixed to the housing. The connection of the two pressure spaces 8, 9 is established when the trailing edge 206' of the stepped piston 206 sweeps over the opening 220' of the connection line 220 and releases it.

The invention claimed is:

1. A friction clutch having a disk pack and a single-acting hydraulic actuator with which the disk pack can be brought into friction locked connection against the force of a spring, the actuator being a piston-in-cylinder unit that is in communication with a pressure fluid source wherein,
   a) the piston-in-cylinder unit has a stepped piston whose first step of small engagement surface bounds a first pressure space with its cylinder and whose second step of larger engagement surface bounds a second pressure space with its cylinder;
   b) the first pressure space is connectable to the second pressure space via a pressure line when a specific pressure is reached in the first pressure space or when the stepped piston has traveled a specific path; and
   c) the second pressure space is connectable via a drain line and a suction line to a fluid reservoir.

2. The friction clutch in accordance with claim 1, wherein the pressure line connecting the first pressure space to the second pressure space has a first check valve that opens on a specific pressure on a side remote from the second pressure space.

3. The friction clutch in accordance with claim 2, wherein the suction line is connected via a second check valve to the fluid reservoir and the drain line is connected via a third check valve to the pressure line.

4. The friction clutch in accordance with claim 3, wherein a compensation line with a restriction bypasses the third check valve.

5. The friction clutch in accordance with claim 3, wherein a pressure sensor that makes a pressure signal available to a control unit is attached to the drain line between the second pressure space and the third check valve.

6. The friction clutch in accordance with claim 1, wherein the connection between the first and the second pressure space is established when the stepped piston has traveled a specific path, and wherein the pressure line is arranged in the interior of the stepped piston and ends at a periphery of the first step of the stepped piston at a position that opens toward the second pressure space after a specific path of the stepped piston.

7. The friction clutch in accordance with claim 1, wherein the connection between the first and the second pressure space is established when the stepped piston has traveled a specific path, wherein the pressure line is arranged in the cylinder of the piston-in-cylinder unit and ends at a periphery of the first step at a position that is released by the stepped piston after a specific path thereof.

8. The friction clutch in accordance with claim 1, wherein the pressure fluid source is a controllable motor/pump unit that is connectable by means of a fast-opening valve and of a fourth check valve to the pressure line and the drain line.

9. The friction clutch in accordance with claim 8, wherein the fast-opening valve consists of a sleeve and a slider disposed therein, said sleeve having at least one first opening through which pressure fluid can flow out of the second pressure space, and wherein the slider is displaceable between a first position in which it releases the first opening such that the pressure fluid is discharged from the second pressure space and a second position in which it covers the first opening to prevent discharge of pressure fluid from the second pressure space.

10. The friction clutch in accordance with claim 9, wherein the force of a spring predominates in the first position of the slider and the force exerted onto it by the pressure fluid predominates in the second position.

11. The friction clutch in accordance with claim 9, wherein a second opening is provided beneath the first opening, the second opening being in communication with the first pressure space and being released by the slider on a falling pressure of the pressure fluid source after the release of the first opening.

12. The friction clutch in accordance with claim 1, wherein the pressure fluid source is a controllably moved master piston in a master cylinder that is connected to the pressure line and the drain line.

13. The friction clutch in accordance with claim 1, wherein the pressure fluid source is connected via a control valve to the pressure line and to the drain line, the control valve controlling fluid flow in both directions.

14. A drive unit for controlling the transfer of drive torque from a drive member to a driven member, comprising:
a disk pack operably disposed between the drive and driven members;
an actuator for applying a clutch engagement force on said disk pack, said actuator including a stepped piston having a first smaller piston portion disposed for sliding movement in a first pressure chamber and a second larger piston portion disposed for sliding movement in a second pressure chamber;
a pressure source in fluid communication with a fluid reservoir and operable for providing a supply of pressurized fluid;
a hydraulic circuit including a pressure line communicating with said second pressure chamber, a first check valve disposed in said pressure line, a branch line connecting said pressure line to said first pressure chamber upstream of said first check valve, a drain line in fluid communication with said second pressure chamber, a suction line connecting said fluid reservoir to said second pressure chamber, and a second check valve disposed in said suction line; and
a control valve unit operably arranged between said pressure source and said pressure and drain lines;
wherein movement of said stepped piston from a retracted position toward an extended position due to increased fluid pressure in said first and second pressure chambers causes said clutch engagement force to be exerted on said disk pack, and wherein movement of said stepped piston from its retracted position to an intermediate prestroke position is caused when said first check valve is closed such that pressurized fluid from said pressure source is supplied by said control valve unit through said branch line to said first pressure chamber.

15. The drive unit of claim 14 wherein movement of said stepped piston from its retracted position to its prestroke position further causes said second check valve to open and allow low pressure fluid to be drawn from said reservoir into said second pressure chamber through said suction line.

16. The drive unit of claim 15 wherein movement of said stepped piston from its prestroke position toward its extended position results from opening of said first check valve and closing of said second check valve such that pressurized fluid is supplied from said pressure source through said control valve unit to both of said first and second pressure chambers.

17. The drive unit of claim 16 further including a control unit operable for regulating the fluid pressure generated by said pressure source and controlling the magnitude of the fluid pressure within said second pressure chamber so as to control the magnitude of said clutch engagement force exerted on said disk pack.

18. The drive unit of claim 16 wherein said control valve unit includes a fast-opening valve and a main check valve arranged in parallel relative to an outlet of said pressure source, said fast-opening valve is normally open and is moved to a closed condition in response to actuation of said pressure source, said fast-opening valve is operable in its open condition to discharge fluid from said first pressure chamber through said branch line and from said second pressure chamber through said drain line to said fluid reservoir, and wherein closure of said fast-opening valve permits said main check valve to open and deliver pressurized fluid from said pressure source to said pressure line.

19. The drive unit of claim 18 wherein said hydraulic circuit further includes a third check valve disposed in said drain line between said second pressure chamber and said fast-opening valve.

20. The drive unit of claim 19 wherein said drain line is connected to said pressure line via said third check valve.

21. The drive unit of claim 19 wherein said hydraulic circuit further includes a compensation line having a flow restrictor and which bypasses said third check valve for providing static balancing of the fluid pressure in said first and second pressure chambers.

22. The drive unit of claim 16 wherein said fast-opening valve includes a sleeve and a slider disposed for sliding movement within said sleeve, said slider having a first end in communication with said pressure source and a second end biased by a spring, wherein said slider is supported for movement between a first position and a second position, said slider is operable in its first position to open an opening in said sleeve to permit the discharge of pressurized fluid from said second pressure chamber and is further operable in its second position to close said opening and allow said main check valve to open and supply fluid to said pressure line, and wherein said spring biases said slider toward its second position.

23. The drive unit of claim 14 wherein said control valve unit is operable to control fluid flow in both directions.

24. The drive unit of claim 23 further including a control unit operable for controlling actuation of said pressure source and said control valve unit.

* * * * *